(12) United States Patent
Kaule et al.

(10) Patent No.: US 12,221,124 B2
(45) Date of Patent: Feb. 11, 2025

(54) MEANS OF TRANSPORTATION AND DEVICE FOR OUTPUTTING A REQUEST TO ASSUME CONTROL OF THE VEHICLE GUIDANCE

(71) Applicant: Bayerische Motoren Werke Aktiengesellschaft, Munich (DE)

(72) Inventors: Dirk Kaule, Munich (DE); Michael Strolz, Munich (DE); Florian Chouard, Bruckberg (DE); Holger Forst, Odelzhausen (DE); Philipp Kerschbaum, Munich (DE)

(73) Assignee: Bayerische Motorenwerke Aktiengesellschaft, Munich (DE)

( * ) Notice: Subject to any disclaimer, the term of this patent is extended or adjusted under 35 U.S.C. 154(b) by 1014 days.

(21) Appl. No.: 17/252,319

(22) PCT Filed: May 9, 2019

(86) PCT No.: PCT/DE2019/100419
§ 371 (c)(1),
(2) Date: Dec. 15, 2020

(87) PCT Pub. No.: WO2019/238155
PCT Pub. Date: Dec. 19, 2019

(65) Prior Publication Data
US 2021/0261151 A1 Aug. 26, 2021

(30) Foreign Application Priority Data
Jun. 15, 2018 (DE) .......................... 102018209704.6

(51) Int. Cl.
*B60W 50/14* (2020.01)
*B60K 35/00* (2024.01)
(Continued)

(52) U.S. Cl.
CPC ............. *B60W 50/14* (2013.01); *B60K 35/00* (2013.01); *B60W 50/029* (2013.01);
(Continued)

(58) Field of Classification Search
CPC .. B60W 50/14; B60W 50/029; B60W 50/082; B60W 2050/0072;
(Continued)

(56) References Cited

U.S. PATENT DOCUMENTS

| 2008/0231196 A1 | 9/2008 | Weng et al. | |
| 2008/0232128 A1 | 9/2008 | Shofar | |
| 2010/0265167 A1* | 10/2010 | Kinoshita | G02B 6/4203 345/82 |
| 2011/0187518 A1* | 8/2011 | Strumolo | B62D 15/029 340/438 |

(Continued)

FOREIGN PATENT DOCUMENTS

| CN | 102883505 A | 1/2013 |
| CN | 203503297 U | 3/2014 |

(Continued)

*Primary Examiner* — Harry Y Oh
(74) *Attorney, Agent, or Firm* — Kieran O'Leary; 2 SPL Patent Attorneys PartG mbB

(57) ABSTRACT

A means of transport and a device (10) for outputting a request for a driver of a means of transport to take over vehicle guidance are proposed. The device (10) comprising:
a line-shaped first LED strip (1) with a first electrical connector (5) comprising a first plurality of LEDs (3),
a line-shaped second LED strip (2) with a second electrical connector (6) comprising a second plurality of LEDs (4),
a control device (7) comprising an interface (8) configured to receive the first electrical connector (5) and the second electrical connector (6), wherein
the first plurality of LEDs (3) is arranged interleaved with respect to the second plurality of LEDs (4) and the control device is configured to output the request as light signals by controlling the first electrical connector (5) and the second electrical connector (6).

15 Claims, 2 Drawing Sheets

(51) Int. Cl.
*B60W 50/029* (2012.01)
*B60W 50/08* (2020.01)
*B60K 35/28* (2024.01)
*B60K 35/60* (2024.01)
*B60W 50/00* (2006.01)

(52) U.S. Cl.
CPC ........... *B60W 50/082* (2013.01); *B60K 35/28* (2024.01); *B60K 35/60* (2024.01); *B60K 2360/172* (2024.01); *B60K 2360/332* (2024.01); *B60K 2360/338* (2024.01); *B60K 2360/782* (2024.01); *B60W 2050/0072* (2013.01); *B60W 2050/146* (2013.01)

(58) Field of Classification Search
CPC ............. B60W 2050/146; B60K 35/00; B60K 2370/172; B60K 2370/332; B60K 2370/338; B60K 2370/782; B60K 2370/175; B60K 2370/1868; B60K 2370/188; B60K 2370/95; B62D 1/046; B62D 1/06; B62D 15/029
See application file for complete search history.

(56) References Cited

U.S. PATENT DOCUMENTS

| | | | | |
|---|---|---|---|---|
| 2014/0111325 | A1* | 4/2014 | Lisseman | B62D 1/06 340/435 |
| 2014/0149809 | A1* | 5/2014 | Bisht | G06F 11/0757 714/55 |
| 2018/0319332 | A1* | 11/2018 | Ebina | B60Q 3/40 |
| 2019/0016383 | A1* | 1/2019 | Spencer | B60K 35/00 |
| 2021/0046975 | A1* | 2/2021 | Zemskov | B60L 15/20 |
| 2021/0232521 | A1* | 7/2021 | Kim | G06F 11/1441 |

FOREIGN PATENT DOCUMENTS

| | | | |
|---|---|---|---|
| CN | 205034163 | U | 2/2016 |
| CN | 106043118 | A | 10/2016 |
| CN | 106132807 | A | 11/2016 |
| DE | 10308901 | A1 | 9/2004 |
| DE | 10346691 | A1 | 5/2005 |
| DE | 102008051385 | A1 | 4/2010 |
| DE | 102015015235 | A1 | 6/2017 |
| DE | 202017105444 | U1 | 12/2017 |
| DE | 10308901 | * | 2/2023 |
| EP | 3124352 | A1 | 2/2017 |

* cited by examiner

MEANS OF TRANSPORTATION AND DEVICE FOR OUTPUTTING A REQUEST TO ASSUME CONTROL OF THE VEHICLE GUIDANCE

CROSS-REFERENCE TO RELATED APPLICATIONS

This application is a 35 U.S.C. § 371(c) national stage entry of PCT/DE2019/100419, filed on May 9, 2019. That application claimed priority to German Application 10 2018 209 704.6, filed on Jun. 15, 2018. The contents of the earlier filed applications are incorporated by reference herein in their entirety.

FIELD

The present invention relates to a means of transport and a device for outputting a take-over request (TOR) for a driver of a means of transport to take over vehicle guidance. In particular, the present invention relates to an improved security in the sense that the request may actually be output and may also be output in the case of an error.

BACKGROUND

The automation of individual passenger transport is currently progressing rapidly. In production vehicles, however, only such driver assistance systems are currently known which require the driver to take over vehicle guidance if a situation can no longer be adequately handled by sensors/automatically. For the function display of driver assistance functions, especially for those with application for highly automated driving (HAD), no long/large function displays comprising hardware redundancy are used so far. Rather, an icon is usually shown on a display and, alternatively or additionally, a sound signal is output to prompt the driver to take over vehicle guidance. The lack of redundancy also limits the safety level that may be achieved with the function display (e.g. to a safety level corresponding to ASIL-B or higher).

It is an object of the present invention to satisfy the need identified above.

SUMMARY

The object identified above is solved, according to the invention, by a device for outputting a request for a driver of a means of transport to take over vehicle guidance of the means of transport. The request may be understood in particular as an optical signal which is always output when the driver, coming from a partially automated drive, is to take over individual driving tasks or the entire vehicle guidance. For this purpose, the device comprises a line-shaped first LED strip comprising a first plurality of LEDs, which comprises a first electrical connector. Within the scope of the present invention, an LED-strip is understood to be a linear arrangement of individual LEDs which are connected as individual components via electrical lines. In particular, the LED strip may be flexible and not be configured in the manner of a matrix corresponding to a conventional display/screen, which means that the luminosity of the individual contained LEDs may be rated to be particularly high. In this way, for example, flashing signals may be generated with an intensity that may unmistakably and inevitably alert even drivers with their eyes closed under suitable conditions. The first electrical connector is configured in particular to drive the plurality of LEDs in a predefined pattern. Here, individual LEDs may be operated with a higher intensity than other LEDs. Alternatively or additionally, different light colors may be emitted by different LEDs of the LED strip. In particular, sequential light patterns may be generated by appropriately controlling the first electrical connector using the first LED strip. In addition, a second LED strip comprising a second electrical connector is provided, which comprises a second plurality of LEDs and for which what was mentioned above in connection with the first LED strip applies accordingly. At least one control device is provided in the device, which comprises an interface configured to receive the first electrical connector and the second electrical connector. In this way, the control device may provide an information technology and/or electrical interface to the LED strips. In this way, the control device is configured to control the two LED strips independently of each other. The first plurality of LEDs is arranged interleaved with the second plurality of LEDs to provide redundancy regarding the hardware used to generate the request. In particular, the interleaved arrangement allows the light patterns used for the request to be continuously generated, even after the failure of a complete LED strip, at the same point in the vehicle interior where they were displayed before the LED strip failed. This provides maximum robustness of the device against failure of an LED strip or a control device controlling the LED strip. Now the request to take over the vehicle guidance by controlling the first electrical connector and the second electrical connector may be output as a light signal by the control device. For example, the LED strips may glow red, pulsate red or even flash when required. The light signals may be predefined or (within a predefined scope) configured by the driver of the means of transport. Using the device according to the invention an increased robustness in the output of requests to take over a vehicle guidance with respect to hardware defects may be achieved, which is why a corresponding device is suitable for the realization of high safety integrity levels (ASIL-B or higher).

The subclaims show preferred further developments of the invention.

The light signals, which are generated by the two LED strips, may be generated in particular by two time-varying identical light patterns. In other words, LEDs of the two LED strips that are arranged spatially adjacent to each other assume a similar or identical illumination state. In this way, corresponding light patterns are created, so that the light signals of both LED strips complement each other in the best possible way. In this way, an intensity and/or color distribution variable in position is supported by both LED strips. If one of the two LED strips fails, the basic appearance of the light signal is essentially retained. The light signal known to the driver is still output despite a hardware defect and the driver intuitively understands the request to take over the vehicle guidance.

Preferably, the control device is configured to detect a defect in one of the two LED strips and, in response, to adjust the control of the other LED strip in a predefined way. For example, to balance the now reduced light intensity, the control of the other LED strip may be adjusted in such a way that the other LED strip now emits a higher light intensity to compensate (proportionately) for the failure of the one LED strip.

For example, the light pattern of the non-failed LED strip may be easily modified to signal the fact to the user in a predefined way that one of the two LED strips has failed. Of course, this does not exclude additional signals to be transferred to the driver to inform him of the defect. Alternatively or additionally, fault memory entries may indicate the failure of the LED strip and optionally automatically initiate a message to a nearby service workshop and, alternatively or additionally, restrict or completely prevent the use of the driver assistance system in question, since a further failure of the remaining LED strip would completely frustrate the output of the above-mentioned light signals.

The LED strips may be configured to be arranged in a steering wheel of a means of transport. In particular, the LED strips may be arranged in the steering wheel rim of the means of transport in such a way that they face the driver when he is performing his driving task. Alternatively or additionally, the LED strips may be arranged at the impact absorber of the steering wheel. In this way, their presence is essentially neutral regarding haptics for the driver.

The control device may also be located inside the steering wheel of the means of transport. Its electrical and/or information technology connection to the LED strips may thus be made particularly easily and cost-effectively (e.g. by conventional wiring). This control device may, in particular, take over the type of light signals and the respectively necessary control of the LEDs of the LED strips. This control device may preferably be connected electrically and/or by information technology to a second control device located outside the steering wheel. This connection may comprise sliding contacts and/or an inductive coupling. However, due to the limited number of maximum possible turns of the steering wheel, wired and/or cabled information/energy transmission is also possible. The second control device, located outside the steering wheel, may be responsible in particular for the execution of the driver assistance function, which currently requires the driver to take over vehicle guidance. In other words, the control device located outside the steering wheel may be intended in particular to initiate the take-over request (TOR).

Preferably, the device may further include an optical diffuser configured to optically homogenize light emerging from the first and second LED strips. The optical diffuser may be arranged as a "milky" cover over the LED strips. In other words, the arrangement of the optical diffuser means that the individual LEDs are not visible to the driver from the outside, which reinforces the impression that even if one LED strip fails, there is no change in the output light signal.

The control device located inside the steering wheel may comprise a microcontroller which takes over control of the first and second LED strips. In order to monitor the microcontroller's functionality, a watchdog may be connected to the microcontroller by information technology and output a warning signal if the microcontroller's functionality is doubtful. In addition, a bus controller may be provided in the first control device to take over communication with the vehicle infrastructure, in particular the second control device located outside the steering wheel. The bus controller may be designed in particular as a CAN bus controller, Flex-Ray bus controller, Most bus controller or similar.

As an alternative or in addition to the watchdog, the control device may also comprise a further microcontroller, each microcontroller being configured to control a respective electrical connector of the control device. The two microcontrollers may additionally comprise an information technology connection to each other, via which they monitor each other's functionality and, if necessary, even take over the function of the other microcontroller (temporarily) and, alternatively or additionally, inform control devices arranged outside the steering wheel about a malfunction of the respective other microcontroller.

According to a second aspect of the present invention, a means of transport is described, which may be implemented as a passenger car, transport, truck, aircraft and/or watercraft. In particular, the means of transport comprises a driver assistance function which is switched off if necessary. In order to enable a driver of the means of transport to issue a request to take over the vehicle guidance of the means transport, an inventive device according to the first mentioned aspect of the invention is provided. The features, combinations of features and benefits obviously result in such a way that reference is made to the above explanations to avoid repetition.

BRIEF DESCRIPTION OF THE FIGURES

Further details, features and advantages of the invention result from the following description and figures, in which.

DETAILED DESCRIPTION

Figure 1:
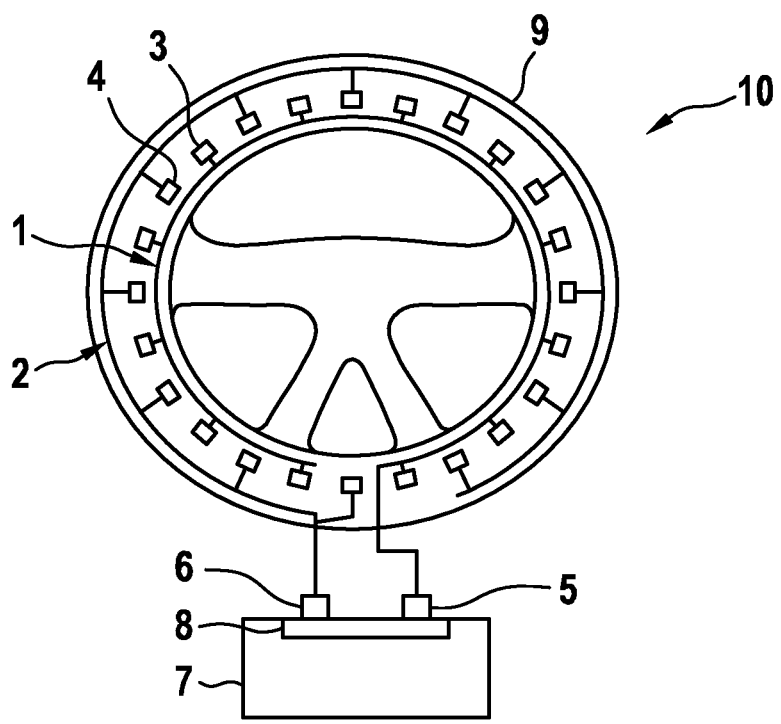
FIG. 1 shows a schematic representation of one embodiment of an inventive device.

FIG. 1 shows a schematic representation of an embodiment of an inventive device 10, which is accommodated in a steering wheel 9 for a passenger car. The steering wheel rim of the steering wheel 9 is surrounded by two LED strips 1, 2, whose LEDs 3, 4 are alternately arranged in an interleaved way and enclose the rim of the steering wheel linearly in their entirety. Electrical connectors 5, 6 at an interface 8 of a control device 7 are configured to output light patterns which are essentially identical to each other by means of the two LED strips 1, 2 for the output of a common light signal as a request for the driver to take over vehicle guidance. The use of individual LEDs compared to a screen may produce considerably higher light intensities, which means that the alarm potential for the driver is significantly higher. The two LED strips 1, 2 represent a complementary ring bus topology in which, for example, two buses/current rails are used to control the LEDs 3, 4. It is obvious to the person skilled in the art that further LED strips and LEDs may be integrated into the device to further increase the redundancy.

Figure 2:
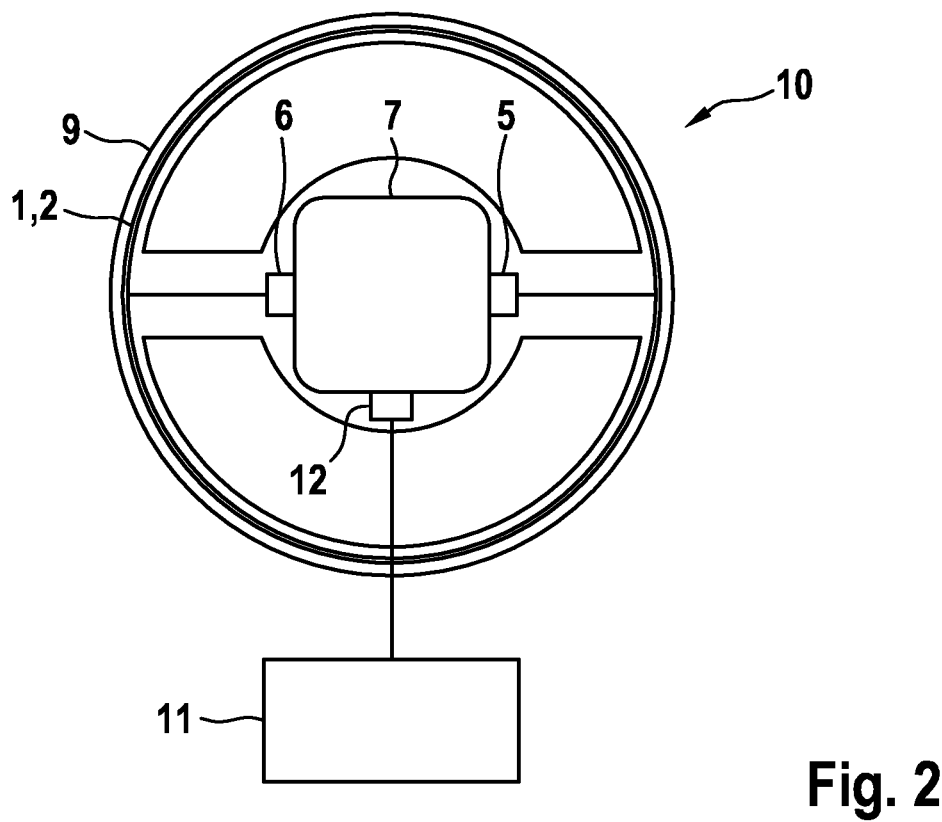
FIG. 2 shows a schematic representation of a second embodiment of an inventive device.

FIG. 2 shows a second embodiment of a device 10 according to the invention, which is connected by information technology to a second control device 11 outside the steering wheel 9 via a first control device 7 in the impact absorber of the steering wheel 9 and via an information technology interface 12. While the control device 11 is intended in particular for taking over driver assistance functions and determining the requirement to output a request for the driver to take over vehicle guidance, the control device 7 located in the steering wheel 9 is intended in particular for the inventive control of the LED strips 1, 2 for outputting the light signals described above.

Figure 3:
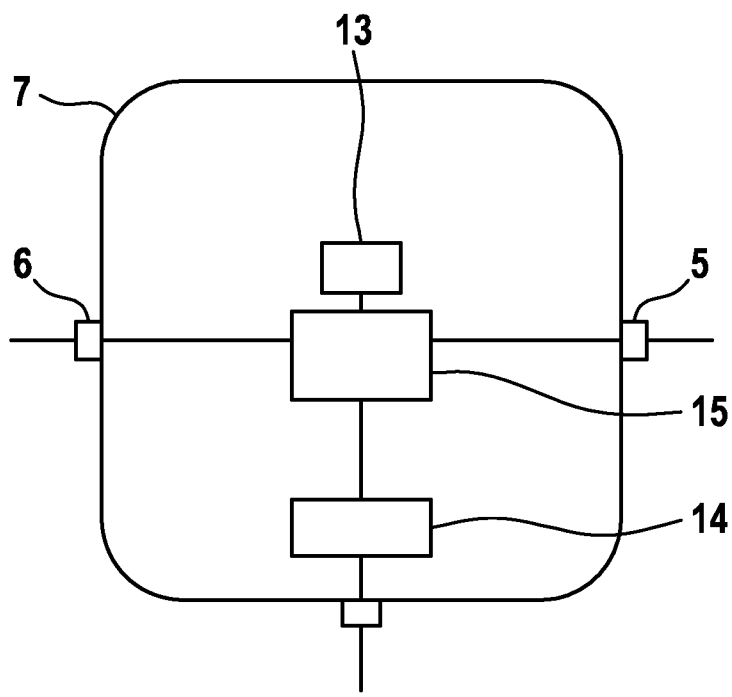
FIG. 3 shows a schematic detailed view of an embodiment of a control device comprising a watchdog.

FIG. 3 shows a schematic representation of the components of a control device 7, which may be used according to the invention and whose microcontroller 15 is configured via the electrical connectors 5, 6 to control the LED strips (not shown). A watchdog 13 connected to the microcontroller 15 by information technology is configured to monitor and/or plausibilise the correct function of the microcontroller 15.

Via a bus controller 14, the microcontroller 15 is configured to communicate with instances located outside the control device 7.

Figure 4:
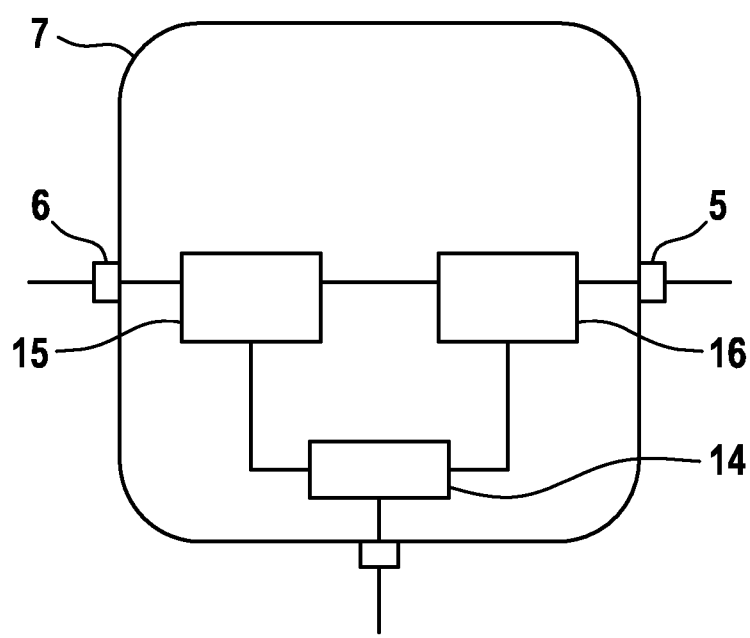
FIG. 4 shows a schematic detailed view of an embodiment of a control device with a second microcontroller.

FIG. 4 shows an alternative implementation of a control device 7, which has been presented in connection with FIG. 3. Instead of a watchdog 13, an additional microcontroller 16 is provided, which is connected to both microcontroller 15 and bus controller 14 by information technology. Normally the microcontroller 15 takes over the control of the second electrical connector 6, while the additional microcontroller 16 takes over the control of the first LED strip via the first electrical connector 5. Both microcontrollers 15, 16 are connected to the bus controller 14 by information technology, which is configured for communication with instances located outside the steering wheel.

The present invention makes it possible to output a request for a driver of a means of transport to take over the guidance of a vehicle by means of a large-surface function display in the form of an LED band with a ring-shaped communication topology, which may be implemented in a package- and cost-optimised manner. A core idea is to implement two or optionally three parallel rings in the form of LED strips instead of one ring. In a realization with two LED strips an alternating arrangement of the LEDs is provided, so that each LED with an odd index is part of a first LED strip, while each LED with an even index is part of a second LED strip. In the case of a realization with three LED strips, this is achieved by applying a modulo 3 operation instead of a modulo 2 operation to the position of the LEDs. An alternative way of arranging the LEDs is that the LED strips are not arranged in parallel, but are arranged in segments one behind the other, wherein in a steering wheel, for example, a first half of the steering wheel rim is illuminated by the first LED strip and the second half of the steering wheel rim by the second LED strip.

LIST OF REFERENCE NUMERALS

1, 2 LED strip
3, 4 LED
5, 6 Electrical connector
7 Control device
8 Interface
9 Steering wheel
10 Device
11 Control device (outside the steering wheel)
12 Interface
13 Watchdog
14 Bus controller
15, 16 Microcontroller

The invention claimed is:

1. A device for outputting a request for a driver of a vehicle to take over vehicle guidance, comprising:
   a line-shaped first LED strip with a first electrical connector comprising a first plurality of LEDs,
   a line-shaped second LED strip with a second electrical connector comprising a second plurality of LEDs,
   wherein the first and the second LED strips are configured to be arranged facing the driver in a steering wheel of the vehicle,
   a control device comprising a watchdog, a microcontroller, a bus controller, and an interface, wherein the interface is configured to receive the first electrical connector and the second electrical connector,
   wherein the first plurality of LEDs is arranged interleaved with respect to the second plurality of LEDs and the control device is configured to output the request as light signals by controlling the first electrical connector and the second electrical connector.

2. The device according to claim 1, wherein the light signals are generated by means of two substantially identical light patterns which are variable in time and in particular also variable in position.

3. The device according to claim 1, wherein the control device is configured to detect a defect of the first LED strip and in response thereto to adjust a control of the second LED strip in a predefined manner.

4. The device according to claim 1, wherein the control device is configured to detect a defect of the first LED strip and in response thereto to increase a light power of the second LED strip in a predefined manner.

5. A device for outputting a request for a driver of a vehicle to take over vehicle guidance, comprising:
   a line-shaped first LED strip with a first electrical connector comprising a first plurality of LEDs,
   a line-shaped second LED strip with a second electrical connector comprising a second plurality of LEDs,
   wherein the first and the second LED strips are configured to be arranged facing the driver in a steering wheel of the vehicle,
   a control device comprising an interface configured to receive the first electrical connector and the second electrical connector,
   wherein the control device is arranged inside a steering wheel of the vehicle and is connected electrically and/or by information technology, in particular via sliding contacts and/or via an inductive coupling, to a second control device arranged outside the steering wheel,
   wherein the first plurality of LEDs is arranged interleaved with respect to the second plurality of LEDs and the control device is configured to output the request as light signals by controlling the first electrical connector and the second electrical connector.

6. The device according to claim 1, wherein the device further comprises an optical diffuser configured to optically homogenize light emerging from the first and second LED strips.

7. A device for outputting a request for a driver of a vehicle to take over vehicle guidance, comprising:
   a line-shaped first LED strip with a first electrical connector comprising a first plurality of LEDs,
   a line-shaped second LED strip with a second electrical connector comprising a second plurality of LEDs,
   wherein the first and the second LED strips are configured to be arranged facing the driver in a steering wheel of the vehicle,
   a control device comprising two microcontrollers, a bus controller, and an interface, wherein the interface is configured to receive the first electrical connector and the second electrical connector,
   wherein the first plurality of LEDs is arranged interleaved with respect to the second plurality of LEDs and the control device is configured to output the request as light signals by controlling the first electrical connector and the second electrical connector.

8. A vehicle comprising a device according to claim 1.

9. The device according to claim 4, wherein the watchdog monitors the microcontroller for a malfunction and outputs a warning signal when the malfunction is detected.

10. The device according to claim 1, wherein the bus controller is connected to a second control device arranged outside the steering wheel, wherein the second control device initiates the request for the driver of the vehicle to take over vehicle guidance.

11. The device according to claim 5, wherein the second control device initiates the request for the driver of the vehicle to take over vehicle guidance.

12. The device according to claim 7, wherein each microcontroller of the two microcontroller is configured to control a respective electrical connector of the first and second connectors.

13. The device according to claim 12, wherein the two microcontrollers monitor each other for a malfunction.

14. The device according to claim 13, wherein when the malfunction is detected in a malfunctioning microcontroller by a functioning microcontroller, the functioning microcontroller takes over control of the respective electrical connector of the malfunctioning micro controller.

15. The device according to claim 13, wherein when the malfunction is detected by a functioning microcontroller, the functioning microcontroller outputs a warning signal to a second control device arranged outside the steering wheel.

* * * * *